June 7, 1927.
A. M. JOSEPHO
1,631,593
PHOTOGRAPHIC APPARATUS
Filed March 27, 1925
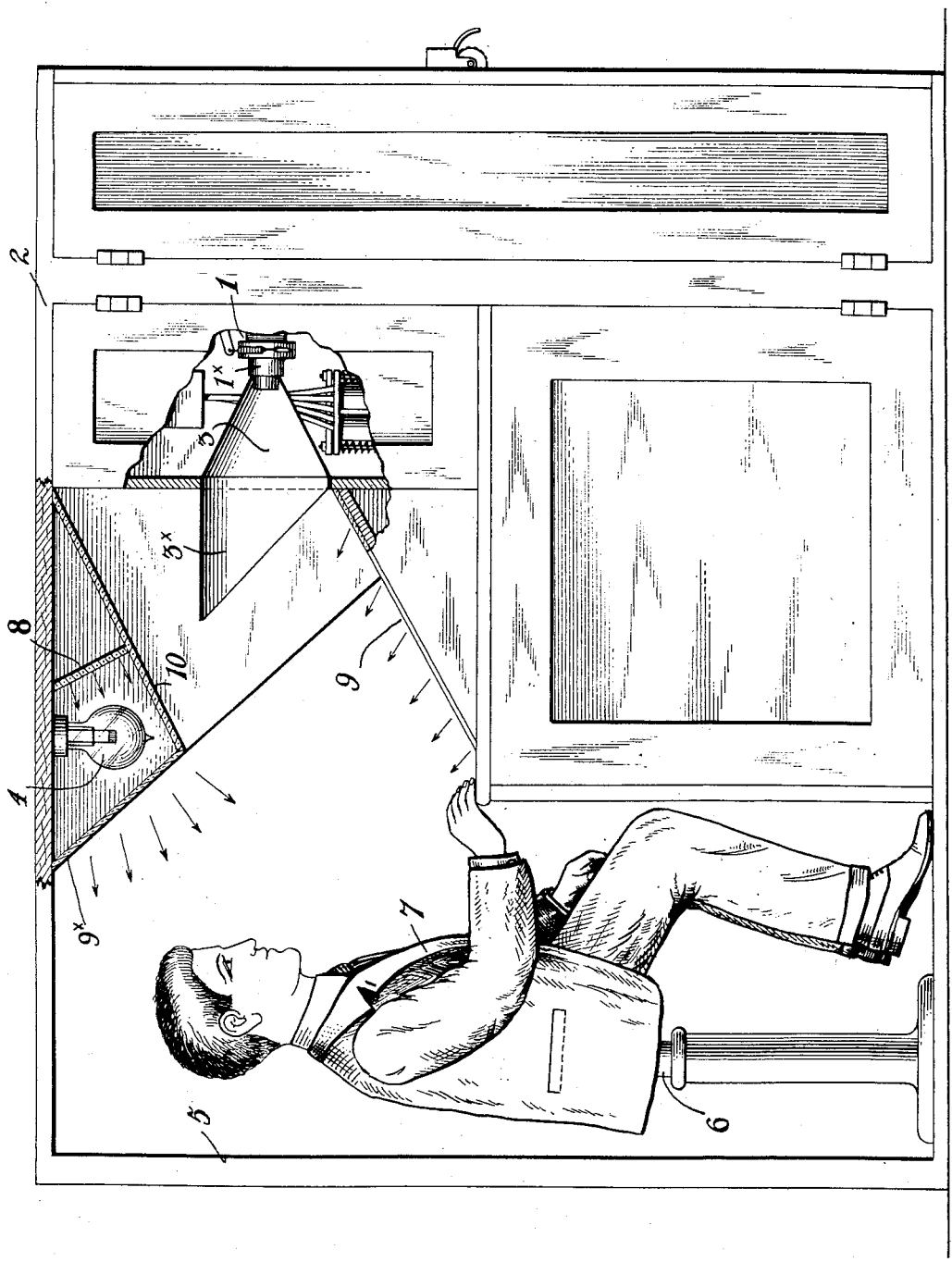
INVENTOR
ANATOL M. JOSEPHO
BY
ATTORNEY Patented June 7, 1927.

1,631,593

UNITED STATES PATENT OFFICE.

ANATOL M. JOSEPHO, OF NEW YORK, N. Y., ASSIGNOR TO PHOTOMATON INC., OF NEW YORK, N. Y., A CORPORATION OF NEW YORK.

PHOTOGRAPHIC APPARATUS.

Application filed March 27, 1925. Serial No. 18,662.

The object of the present invention is to provide means in combination with an automatic, for example coin controlled camera and developing mechanism for properly placing and illuminating the person or object to be photographed, the illumination being such that from a single source the light will be so thrown and diffused as to substantially eliminate shadows within the range of the lens.

The invention will be understood by reference to the accompanying drawing in which—

The figure represents an embodiment of the invention shown in side elevation.

By reference to the drawing it will be seen that the embodiment therein shown represents a camera 1 supported within a casing 2, its lens frame 1ˣ being disposed at the small end of a funnel-like shade 3 which is formed with an overhanging member 3ˣ. The illumination is from the top of the apparatus, a single lamp 4 being shown. The casing is provided with a back wall 5 which provides a neutral or positive ground for the picture to be taken. It may be plain surfaced and light reflecting in character or it may be painted with an appropriate setting.

In the present embodiment the apparatus is designed for portrait photography. To this end a seat 6 is provided immediately in advance of wall 5, for the support of the person to be photographed, as for example the man 7. For maximum conservation of space the subject is placed a short distance only from the camera lens, and this creates a lighting problem where the photographic portrait is to be "untouched" or finished in exactly the same sharpness as when exposed as will customarily be the case. If the light is not thrown uniformly over the face of the subject, a good portrait cannot be obtained because of the shadows, and if the light is strong it will result in a "harsh", bold and unpleasing portraiture as well as tend to cause the subject to frown or partially close his eyes from the intensity of the light, the latter effect being particularly felt when the light is suddenly thrown on and exists for a short interval of time only, as in the case of the automatic coin controlled photographic apparatus.

By means of the present invention the aforesaid problems are overcome in such manner as to reduce illumination to a light source or to even the single lamp element 4. To this end, I place rearwardly of lamp 4, and in forwardly inclined position, a mirror 8. Thus back thrown light rays which would ordinarily be wasted for the most part are thrown forwardly to augment those naturally thrown forward by the lamp. In addition I provide a rearwardly inclined mirror 9 which has a lower edge extending somewhat below the camera range and an upper edge at a substantially higher position.

The mirror 8 is disposed above the head of the average subject and its action is to throw the light rays forwardly and downwardly upon the face and bust of the subject. The mirror 9 is, for the most part disposed below the head of the subject and its action is to throw the light rays forwardly and upwardly to neutralize the shadows resultant from the first named rays. The combined action of the said light ray diverting means is to uniformly distribute the light over the subject and eliminate all such shadows as would mar the portraiture.

In order to prevent glare and harsh effects I shield lamp 4 by means of a translucent glass sheet 9ˣ disposed forwardly of the lamp, and a second translucent glass sheet 10 below the lamp, sheet 10 preferably being inclined to the same degree as mirror 9. By such means a single high power lamp 4 or a series of lower powered lamps, may be employed within a few feet of the subject without objectionable glare.

It will be understood that various modifications may be made in the embodiment illustrated in the drawing, without departing from the spirit of the invention, what I claim and desire to secure by Letters Patent being as follows, it being understood that by the term mirror I include any reflection having the same or equivalent effect, and by translucent glass I include any body having the similar effect of permitting the transmission of light rays while reducing their glare.

Claims:

1. In photographic apparatus, lighting means comprising a lighting element, a light reflector disposed rearwardly of said lighting element and forwardly inclined relatively to the position of the subject to be photographed and a rearwardly inclined light reflector disposed below said first named mirror, as and for the purpose set forth.

2. In photographic apparatus, lighting means comprising a lighting element, a light reflector disposed rearwardly of said lighting element and forwardly inclined relatively to the subject to be photographed, a rearwardly inclined light reflector disposed below said first named mirror, and translucent glass members intermediate the lighting element, the subject and the second mirror.

3. In photographic apparatus, lighting means comprising a lighting element, a light reflector disposed rearwardly of said lighting element and forwardly inclined relatively to the position of the subject to be photographed, and a forwardly inclined translucent glass in advance of said lighting element, as and for the purpose set forth.

4. In photographic apparatus, a casing provided with a back wall and a top wall, a lighting element supported by said top wall, a forwardly inclined light reflector disposed rearwardly of the lighting element, a translucent glass disposed in front of said lighting element, a second light reflector disposed below the camera range and rearwardly inclined relatively to the position of the subject, and a translucent glass intermediate the lighting element and said second light reflector.

In testimony whereof, I have signed my name to this specification.

ANATOL M. JOSEPHO.